Dec. 31, 1963 W. M. RIKER 3,116,456
COUNTER HAVING GATED CLOCK PULSE TO ALLOW SKIPPING OF COUNTS UNTIL SYNCHRONIZED WITH TIMING SIGNALS
Filed Nov. 9, 1960 4 Sheets-Sheet 1
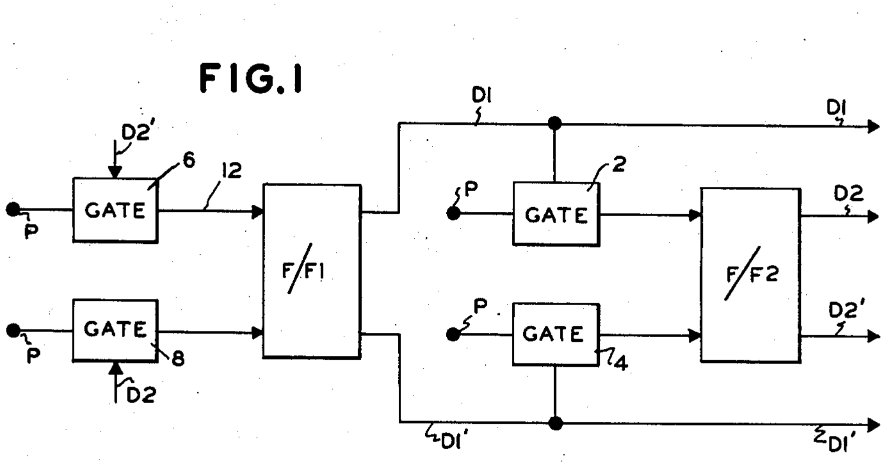
FIG. 1
FIG. 2
11
| D1 | D1' | D2 | D2' |
|---|---|---|---|
| 1 | 0 | 1 | 0 |
| 1 | 0 | 0 | 1 |
| 0 | 1 | 0 | 1 |
| 0 | 1 | 1 | 0 |
| 1 | 0 | 1 | 0 |
| 1 | 0 | 0 | 1 |
| 0 | 1 | 0 | 1 |
| 0 | 1 | 1 | 0 |
| 1 | 0 | 1 | 0 |
13
| D1 | D1' | D2 | D2' |
|---|---|---|---|
| 0 | 1 | 1 | 0 |
| 1 | 0 | 1 | 0 |
| 1 | 0 | 0 | 1 |
| 0 | 1 | 0 | 1 |
| 0 | 1 | 1 | 0 |
| 1 | 0 | 1 | 0 |
| 1 | 0 | 0 | 1 |
| 0 | 1 | 0 | 1 |
| 0 | 1 | 1 | 0 |
15
| D1 | D1' | D2 | D2' |
|---|---|---|---|
| 1 | 0 | 0 | 1 |
| 0 | 1 | 0 | 1 |
| 0 | 1 | 1 | 0 |
| 1 | 0 | 1 | 0 |
| 1 | 0 | 0 | 1 |
| 0 | 1 | 0 | 1 |
| 0 | 1 | 1 | 0 |
| 1 | 0 | 1 | 0 |
| 1 | 0 | 0 | 1 |
17
| D1 | D1' | D2 | D2' | |
|---|---|---|---|---|
| 0 | 1 | 0 | 1 | ORIGINAL STATE |
| 0 | 1 | 1 | 0 | COUNT 1 |
| 1 | 0 | 1 | 0 | COUNT 2 |
| 1 | 0 | 0 | 1 | COUNT 3 |
| 0 | 1 | 0 | 1 | COUNT 4 |
| 0 | 1 | 1 | 0 | |
| 1 | 0 | 1 | 0 | |
| 1 | 0 | 0 | 1 | |
| 0 | 1 | 0 | 1 | |
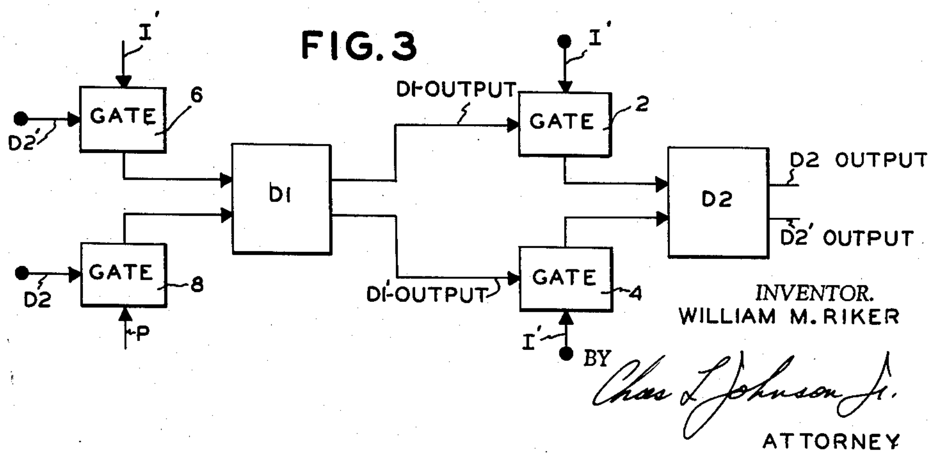
FIG. 3
INVENTOR.
WILLIAM M. RIKER
BY Chas L. Johnson Jr.
ATTORNEY INVENTOR.
WILLIAM M. RIKER
BY Chas L. Johnson Jr.
ATTORNEY COUNTER HAVING GATED CLOCK PULSE TO ALLOW SKIPPING OF COUNTS UNTIL SYNCHRONIZED WITH TIMING SIGNALS Filed Nov. 9, 1960 4 Sheets-Sheet 3

INVENTOR.
WILLIAM M. RIKER
BY Chas L. Johnson Jr.
ATTORNEY

Dec. 31, 1963 W. M. RIKER 3,116,456

COUNTER HAVING GATED CLOCK PULSE TO ALLOW SKIPPING OF COUNTS UNTIL SYNCHRONIZED WITH TIMING SIGNALS

Filed Nov. 9, 1960 4 Sheets-Sheet 4

INVENTOR.
WILLIAM M. RIKER
BY Chas L Johnson Jr.
ATTORNEY 3,116,456

COUNTER HAVING GATED CLOCK PULSE TO ALLOW SKIPPING OF COUNTS UNTIL SYNCHRONIZED WITH TIMING SIGNALS

William M. Riker, Alamogordo, N. Mex., assignor to Monroe Calculating Machine Company, Orange, N.J., a corporation of Delaware Filed Nov. 9, 1960, Ser. No. 68,212
3 Claims. (Cl. 328—42)

This invention relates generally to timing circuits and more particularly to circuits for synchronizing a counting operation with a timing signal.

In apparatus for data handling and other functions, it is often necessary to utilize a counter or counting circuit which is correctly phased or time sequenced with respect to external timing pulses. It is very important that the apparatus be capable of providing the proper count in response to the external timing pulse regardless of state or phase of the counter when an external timing signal first occurs. It is to the solution of this problem that the present invention is directed.

It is therefore a principal object of this invention to provide means for interlocking the operation of a counter with a timing signal.

It is another object of this invention to provide circuitry for causing a counter to synchronize itself with a timing signal and thereafter count in accordance with the occurrence of the timing signal.

It is a further object of this invention to provide a counter capable of skipping counts or marking time so as to align itself time-wise with the occurrence of a timing signal.

These and other objects and novel features of the invention are set forth in the appended claims and the invention as to its organization and its mode of operation will best be understood from a consideration of the following detailed description of the preferred embodiment when used in connection with the accompanying drawings which are hereby made a part of the specification, and in which:

FIG. 1 is a block diagram of a counter which may be utilized in the practice of the invention.

FIG. 2 is a table of the conductive states of the counter for each of four different possible original states.

FIG. 3 is a block diagram of one embodiment of the invention.

Figure 4:
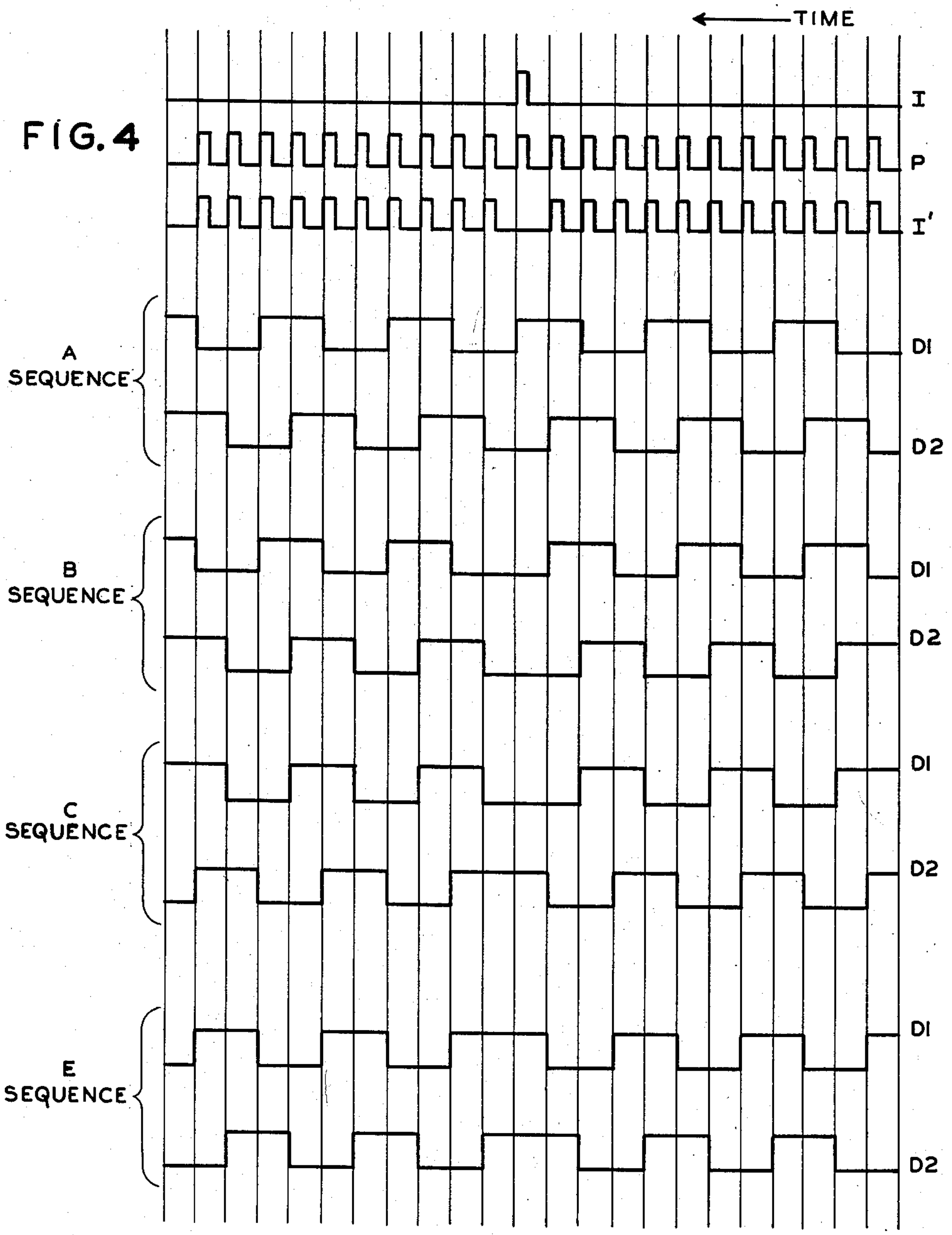
FIG. 4 is a time representation of the signals applied to and emanating from the circuit illustrated by FIG. 3.

The preferred embodiment of this invention provides for bistable counting elements to be controlled by gate circuits which are in turn responsive to the coincidence of signals from the bistable counting elements themselves and various timing signals. These timing signals, in the preferred embodiment, are made up of clock pulses and gated clock pulses which are applied to the various counter gate circuits in a sequence depending on the state of conduction chosen to be defined as the original state. Thus the preferred embodiment utilizes two bistable counting circuits, such as flip-flops, in which each circuit has the two input connections and two output connections normally associated with flip-flops. Each of four gate circuits are interposed between one output of the first bistable flip-flop and an input of the second flip-flop. Each gate circuit passes a signal to the input of a flip-flop upon the coincidence of a gate input signal from a flip-flop and a timing pulse. By applying the series of continuous clock pulses to one gate and gated clock pulses to the other three gates the counter flip-flops will skip or wait from one to three count times so the counter circuits become synchronized or locked in with the gated clock pulse timing signals.

It may therefore be seen that one feature of the invention is the control of a counter by timing pulses so as to synchronize the counter with timing signals.

It is another feature of the invention that both clock pulses and gated clock pulses are utilized to gate input signals to bistable counting members to provide counter apparatus which will count or step from a known initial state or condition.

It is yet another feature of the invention that gated inputs to bistable counting members are controlled by clock and gated clock signals so as to synchronize a counter with clock pulses in a time oriented manner.

For descriptive purposes the following definitions will be utilized in discussing the operation of the invention:

I—External Timing Pulse
P—Clock Pulses
I′—Gated Clock Pulses
D1—Counter Flip-Flop No. 1
D2—Counter Flip-Flops No. 2
G—Gate In the following detailed description of the apparatus by which the objects and features of the invention are explained, operation of FIG. 1 shall be considered first. FIG. 1 shows a gray code arrangement for counting to four by means of two flip-flops in which the two outputs of each flip-flop are connected through gating circuits to the inputs of the other flip-flop. The conditions for gating a pulse to the flip-flop inputs is that the control signal to the gate, D1, D1′, D2 or D2′, is in the low or "0" state. The clock, P, pulses are applied simultaneously to all four gates, 2, 4, 6, and 8. Assuming that the condition of D1 and D2 is such that both are "on," the outputs D1 and D2 of F/F1 and F/F2 are both high or "1" while D1′ and D2′ are low or "0." Upon the occurrence of the next clock pulse, P, an input will appear which tends to turn on D1 and D2′ by passing a signal through gates 6 and 4. Since D1 was originally "on," the signal at conductor 12 will have no effect while D2 will be switched or change state from D2 to D2′.

In like manner, upon the arrival of the next clock pulse P, D1 will change state due to the action of F/F1 while D2 remains as it was for the previous clock pulse. This action of alternate flip-flop activation will continue until the original configuration returns wherein D1 and D2 are high while D1′ and D2′ are low. The above is shown graphically in chart 11 of FIG. 2. Charts 13, 15, and 17 of FIG. 2 indicate alternate original states and their ensuing counts, it being understod that the original state may be arbitrarily designated, the remaining counts following automatically. It is of course seen from the charts that, regardless of the original configuration of the flip-flops, the original configuration will reoccur after four counts in each instance.

In some counter applications it is desirable to have the counter in the same specified state each time an external timing pulse or signal is present, regardless of the original configuration of the counter. FIG. 4 is a graphic representation of the control signals for such an arrangement and FIG. 3 illustrates apparatus for accomplishing such a timing function.

As in reference to FIG. 1, P denotes the clock pulses while I′, which is shown in FIG. 4 and indicated as an input in FIG. 3, represents a gated pulse train including all the P pulses except the P pulse occurring at the time of the external timing pulse. The timing diagrams of FIG. 4 are drawn to illustrate operation of the counter and the A sequence wherein $D1=1$, $D1'=0$, $D2=0$ and $D2'=1$ is arbitrarily chosen as the desired state of the counter upon the occurrence of the external timing pulse I.

As may be seen from FIG. 3, the gated clock pulses I′ are applied to gates 2, 4, and 6 while the clock pulses P are applied to gate 8. The operation of the counter is exactly as explained in reference to FIG. 1 except when there is no pulse present in the I′ pulse train, which occurs at the time designated by I, representative of an external timing pulse. For this reason it is necessary to analyze only this time interval. For sequence A, at time interval I, flip-flop D1 is "1," and D2 is "0." It may be seen therefore that D1 is changed from $D1=1$ to $D1'=1$ and there is no input to D2 because there is no pulse present from I′. Since this is the desired counter configuration at time I, the A sequence continues without change.

Referring now to the B sequence of FIG. 4, at time I it is seen that the counter configuration is $D1=0$, $D1'=1$, $D2=0$, $D2'=1$. It should be noted that the time base progresses from right to left in FIG. 4. At this time, therefore, the gate to trigger D2 is energized, but since there is no pulse at I′, D2 does not change state. The gate to trigger D1′ is also energized and a trigger is present due to P, but D1′ is already "on" so no change of state results.

Thus it is seen that no change occurs at time I, and the counter resumes normal operation upon the arrival of the next clock pulse P or I′. However it is this skip or jump action which has now aligned the counter to the desired configuration, $D1=1$, $D2=0$, which will occur at the next occurrence of I.

In like manner sequence C will "skip" to sequence B and then to sequence A, which represents normal operation, after two I pulses occur.

Sequence E will skip to sequence C, then to sequence B, and then to sequence A after three I pulses occur.

It may thus be seen that regardless of the original counter configuration, the counter will always become set up or aligned, after a maximum of three impulse intervals, to the desired state represented by the pulse at time I.

Any desired counter configuration may be set up as the normal operating mode, by the relocation of the P input to the correct gate.

The gates 2, 4, 6, and 8 may of course be of any of the well-known types used in the art, the only requirement for the practice of this embodiment of the invention being that to gate a pulse to the flip-flop inputs the control signal to the gate is low and the change of state occurs on the fall time of the timing pulse I. Any well-known flip-flop or other bistable circuit arrangement may be utilized in practicing this embodiment.

Figure 5:
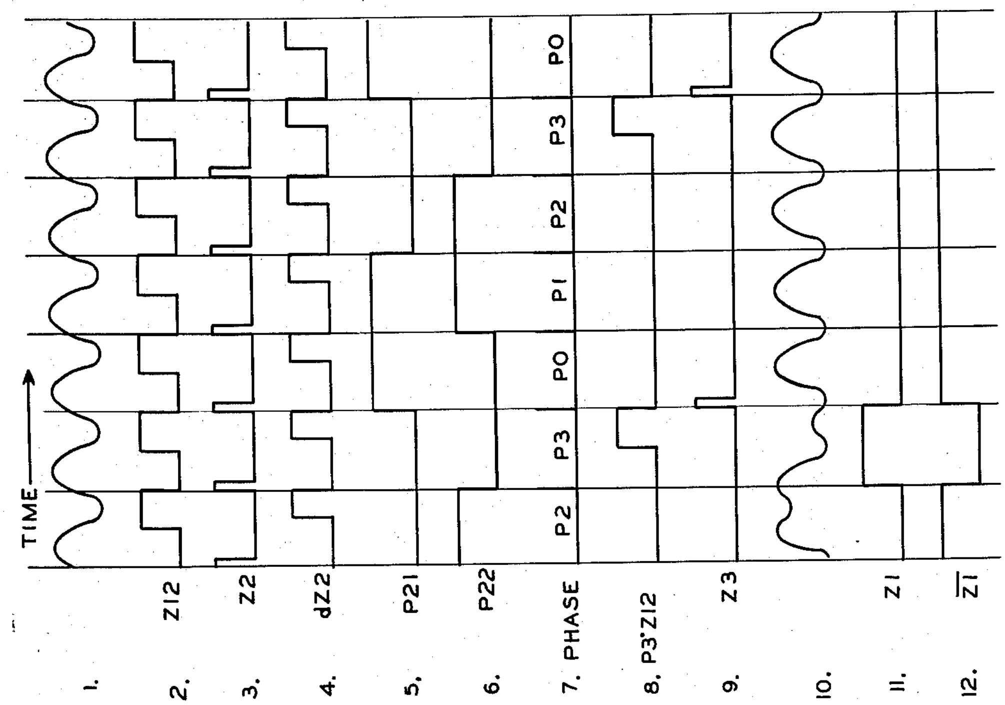
FIG. 5 shows the time representation of the signals applied to and emanating from the circuit illustrated by FIG. 6.

Another embodiment of the invention and its operation may be seen from an examination of FIGS. 5–9. The waveforms of FIG. 5 depict the signals present during the operation of the circuits symbolically shown in FIGS. 6–8.

In one embodiment the invention is utilized with a drum type computer which has three clock or timing tracks which may be designated the master track, the sector index track and the sector address track.

Figure 8:
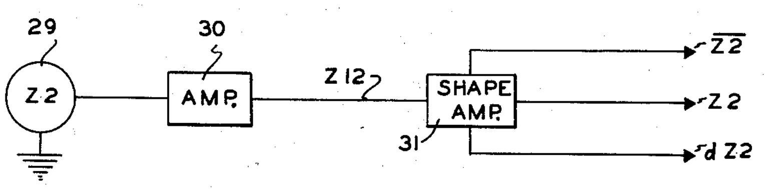

The master track produces a signal which when amplified, may be called the high speed clock or Z2 as shown at line 3 of FIG. 5. This Z2 signal may be derived from a recording made on the drum when the computer is constructed, although this approach is not essential to the successful practice of the invention. The playback from this master track resembles a sine wave and may be illustrated generally as shown at line 1 of FIG. 5. This playback signal from the Z2 head 29 of FIG. 8 is amplified and clipped by the playback amplifier 30 of FIG. 8 to yield the signal Z12, which is illustrated as waveform number 2 on the timing diagram FIG. 5. This Z12 signal is then amplified and shaped by the Z2 amplifier-shaper 31 to produce the high speed clock Z2 which is shown as waveform number 3 in FIG. 5. The Z2 amplifier also produces a delayed clock $dZ2$, illustrated on line 4 of FIG. 5, which may be used for recording such as in a general storage location.

A gray code counter of any well-known configuration may be used to count the Z2 pulses. The outputs P21 and P22 of the counter are shown as waveforms number 5 and 6 of timing diagram FIG. 5. The two signals P21 and P22, with their "not" signal $\overline{P21}$ and $\overline{P22}$ constitute four possible states called phase intervals. These phase intervals are numbered phase 0, 1, 2, and 3, designated P0, P1, P2, and P3 and their time positions are shown on line 7 of FIG. 5. The signal P3 and Z12 are "anded" together to produce the waveform $P3.Z12$ shown on line 8 of the FIG. 5 timing chart. Since P3 occurs once every fourth Z2 interval, the signal shown on line 8 is actually every fourth Z12 pulse. This signal, when amplified and shaped by the Z3 shaper-amplifier produces a low speed clock signal Z3 which is illustrated on line number 9 of FIG. 5. Since P3 is used to generate the Z3 signal, P0 will always be the first phase interval following the Z3 pulse.

Figure 7:
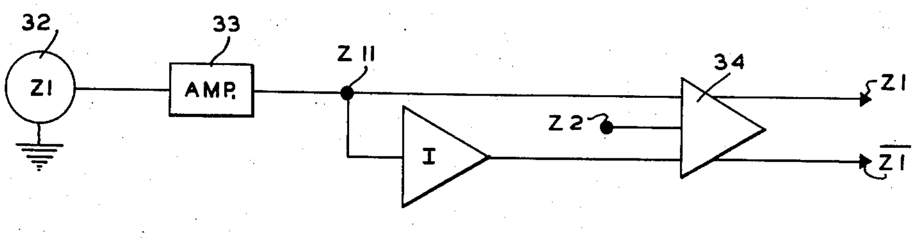
FIGS. 7 and 8 are symbolic representations of the means for generating some of the signals of FIGS. 5 and 6.

The sector index track is used to produce the sector index pulse Z1 on line 11 of FIG. 5. This track may consist of pulses recorded around the drum like the master track except that the polarity of every 128th bit is reversed, as shown in line number 10 of FIG. 5. This track then divides the drum into 16 sectors. Pick-up head 32 of FIG. 7 reads these signals. The output of the sector index playback amplifier 33 is strobed by the Z2 clock at the input to the playback flip-flop 34. The output of the playback flip-flop 34 of FIG. 7 is shown at line 11 of FIG. 5 and is designated the Z1 signal.

Since the phase counter might start in any one of its four states when power is turned on, a provision is made to synchronize the phase counter with the Z1 signal. The $\overline{Z1}$ signal is applied to the phase counter in such a way as to inhibit any change in the state of the counter except for the change from P3 to P0. If the counter is out of step, that is, not in P3 during $\overline{Z1}$, it will miss one count during the $\overline{Z1}$ pulse each word time until the counter is changing from P3 to P0 when the $\overline{Z1}$ pulse occurs. At that time the counter will be in step with the $\overline{Z1}$ signal and will remain in step as long as the computer remains on. This synchronizing process may take a maximum of three word times when the computer is first turned on.

Figure 6:
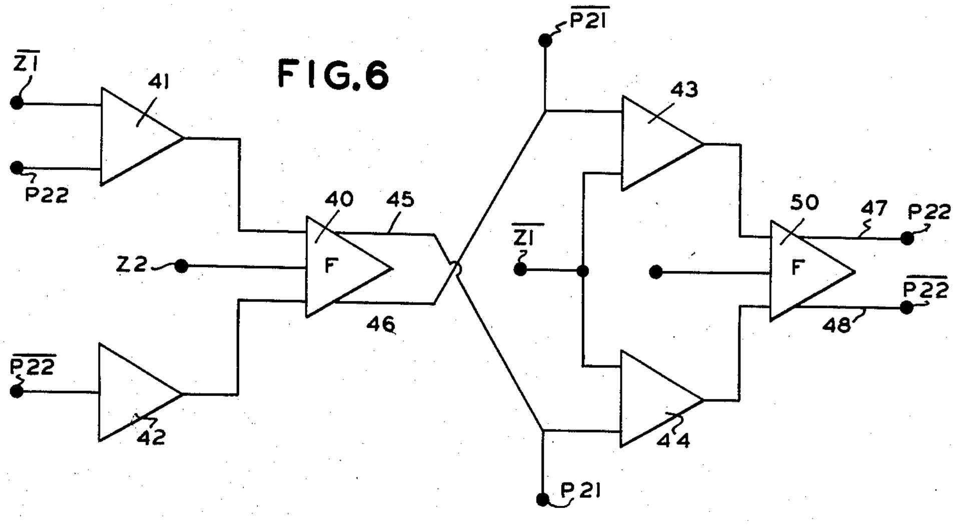
FIG. 6 is a symbolic representation of one embodiment of the invention.

This may be more readily seen from a detailed description of the operation of FIG. 6 with reference to the timing signals illustrated by FIG. 5. The gated flip-flops 40 and 50 are interconnected as a gray code counter with four "and" circuits 41, 42, 43, and 44. The outputs 45, 46, 47 or 48 of flip-flops 40 and 50 will switch from a "0" to a "1" level only when the corresponding "and" signal from 41, 42, 43 or 44 is high or at "1" when the gate signal Z2 occurs. By applying the negative Z1 signal $\overline{Z1}$ to three of the "and" circuits 41, 43, and 44 of FIG. 6 three flip-flops will be prevented from changing state during the occurrence of $\overline{Z1}$. The fourth flip-flop, which is driven by "and" gate 42 will be allowed to change state when $\overline{P22}$ has been high and the Z2 gate occurs. By this means the counter is made to synchronize its count with the Z1 and Z2 signals and thereby lock in with them. It may easily be seen that if it were desired that the counter count or change phase in a different relation to the timing pulses, this could be accomplished by merely applying the $\overline{Z1}$ signal to all the "and" gates except that which would be desired to change state at that time.

Figure 9:
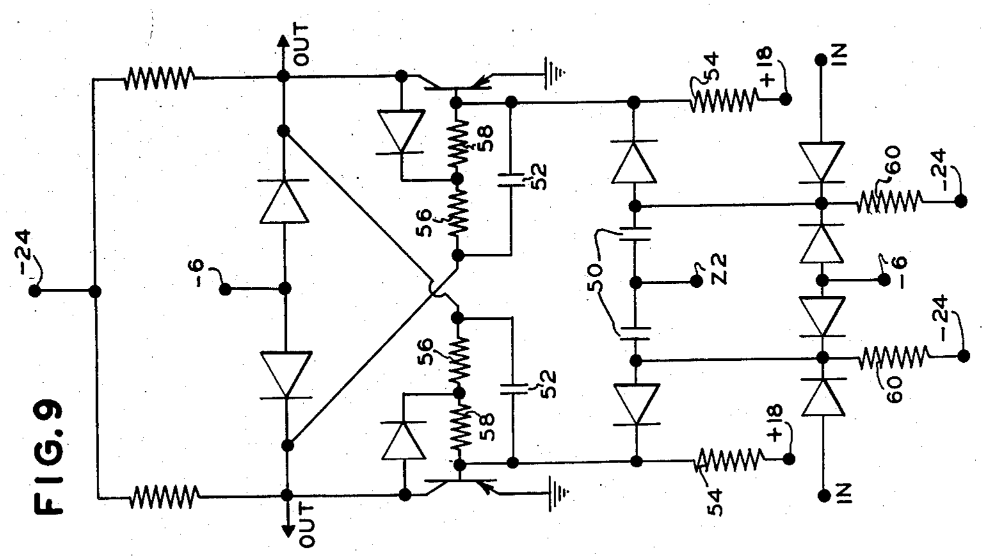
FIG. 9 is a schematic representation of the flip-flops shown in FIGS. 6 and 7.

One circuit for accomplishing the flip-flop action of flip-flops 40 and 50 is shown in FIG. 9. Inasmuch as the input signals, in the embodiment for which this circuit was designed, will either be −6 volts or zero volts the circuit will switch only if the input has been at zero volts for a period of time prior to the clock or Z2 signal going to zero from −6 volts. In one embodiment the circuit values of FIG. 9 were as follows.

| Part number: | Value |
|---|---|
| 50 | 270 $\mu\mu$fd. |
| 52 | 500 $\mu\mu$fd. |
| 54 | 47K ohms. |
| 56 | 4.7K ohms. |
| 58 | 470 ohms. |
| 60 | 68K ohms. |
| Transistors | Type 2N404. |

It is therefore evident that all the objects of the invention may be realized from the operation of the disclosed apparatus.

It should be understood that this invention is not limited to specific details of construction and arrangement thereof herein illustrated, and that changes and modifications may occur to one skilled in the art without departing from the spirit of the invention; the scope of the invention being set forth in the following claims.

What is claimed is:

1. Timing apparatus responsive to timing clock pulses having an omitted pulse at a significant count time and gated clock pulses consisting of a counter including first and second flip-flop circuits, each of said circuits having two input and two output connections, and gate means interconnecting the output of each of the said flip-flop output connections to one of said flip-flop input connections, the said gate means providing an input signal to its associated flip-flop only upon the coincidence of a clock pulse and flip-flop pulse whereby the operation of the said gate means and associated flip-flop assures that the counter will skip one or more counts due to the omitted pulse failing to generate a gate signal so as to synchronize its counting with the said clock pulse.

2. A synchronizing circuit for controlling a counter circuit in accordance with timing signals comprising a plurality of bistable circuits whose state of conduction represents a given count and which are interconnected by gate circuits, characterized by the fact that said gate circuits are operative in response to signals from said bistable circuits, clock pulses, and gated timing signals and include at least three "and" circuits having simultaneous gated timing signal inputs which prevent the occurrence of a gate circuit output signal during a selected time so that the said counter circuit will skip a count if not aligned with said gated timing signals.

3. A synchronized counter having a fixed number of counts comprising first and second timing signals each having a given frequency, the second timing signal frequency exceeding the first timing signal frequency by a factor equal to the number of counter counts the counter including gated flip-flop means for generating output signals representative of a plurality of counts, and circuit means for controlling the flip-flop means the circut means including first and second "and" gate means, the first "and" gate means including circuitry for applying a coincident signal to the said second "and" means upon the simultaneous occurrence at the first "and" gate input of a flip-flop output and a first timing signal, the second "and" means being responsive to the first "and" gate means output and a second timing signal for generating a signal for altering the conductive state of the flip-flop, the said first timing signal being applied to every first "and" gate except one designated as the first timing gate and wherein the first timing signal includes an inhibitory signal portion for preventing a change of state of every flip-flop except one whereby the said counter operates in synchronization with the first timing gate.

References Cited in the file of this patent

UNITED STATES PATENTS

| | | |
|---|---|---|
| 2,700,731 | Crayford | Jan. 25, 1955 |
| 2,823,855 | Nelson | Feb. 18, 1958 |
| 2,971,157 | Harper | Feb. 7, 1961 |

UNITED STATES PATENT OFFICE

CERTIFICATE OF CORRECTION

Patent No. 3,116,456 December 31, 1963

William M. Riker

It is hereby certified that error appears in the above numbered patent requiring correction and that the said Letters Patent should read as corrected below.

Column 4, line 20, for "signal" read -- signals --; column 5, line 29, strike out "having an omitted pulse at a significant count time" and insert the same after "pulses" in line 30, same column 5.

Signed and sealed this 16th day of June 1964.

(SEAL)
Attest:

ERNEST W. SWIDER
Attesting Officer

EDWARD J. BRENNER
Commissioner of Patents